April 4, 1961
W. F. JOSEPH
2,978,627
TRANSISTORIZED POWER SUPPLIES
Filed Feb. 26, 1957
3 Sheets-Sheet 1
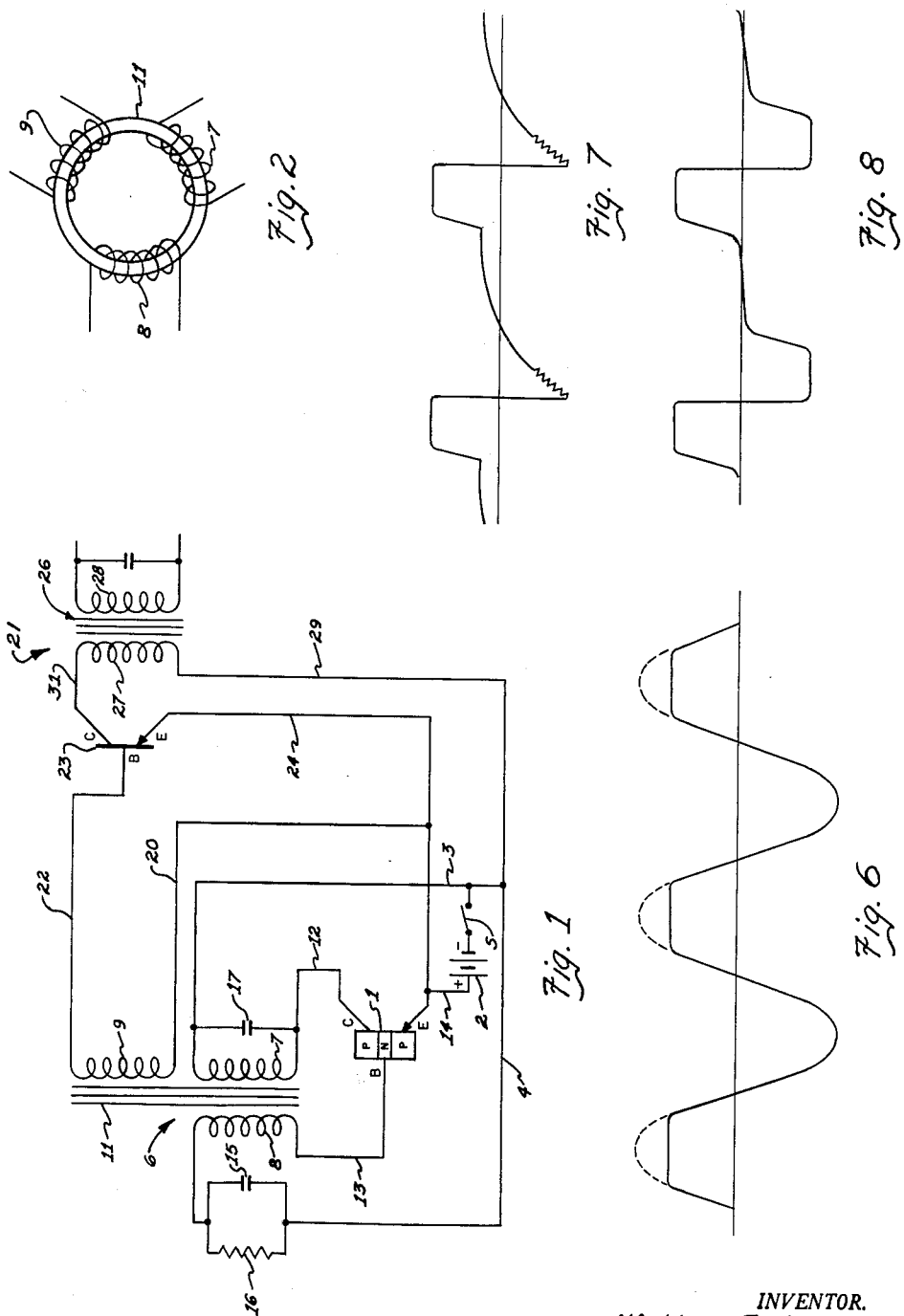
INVENTOR.
Walter F. Joseph
BY George Lipkin

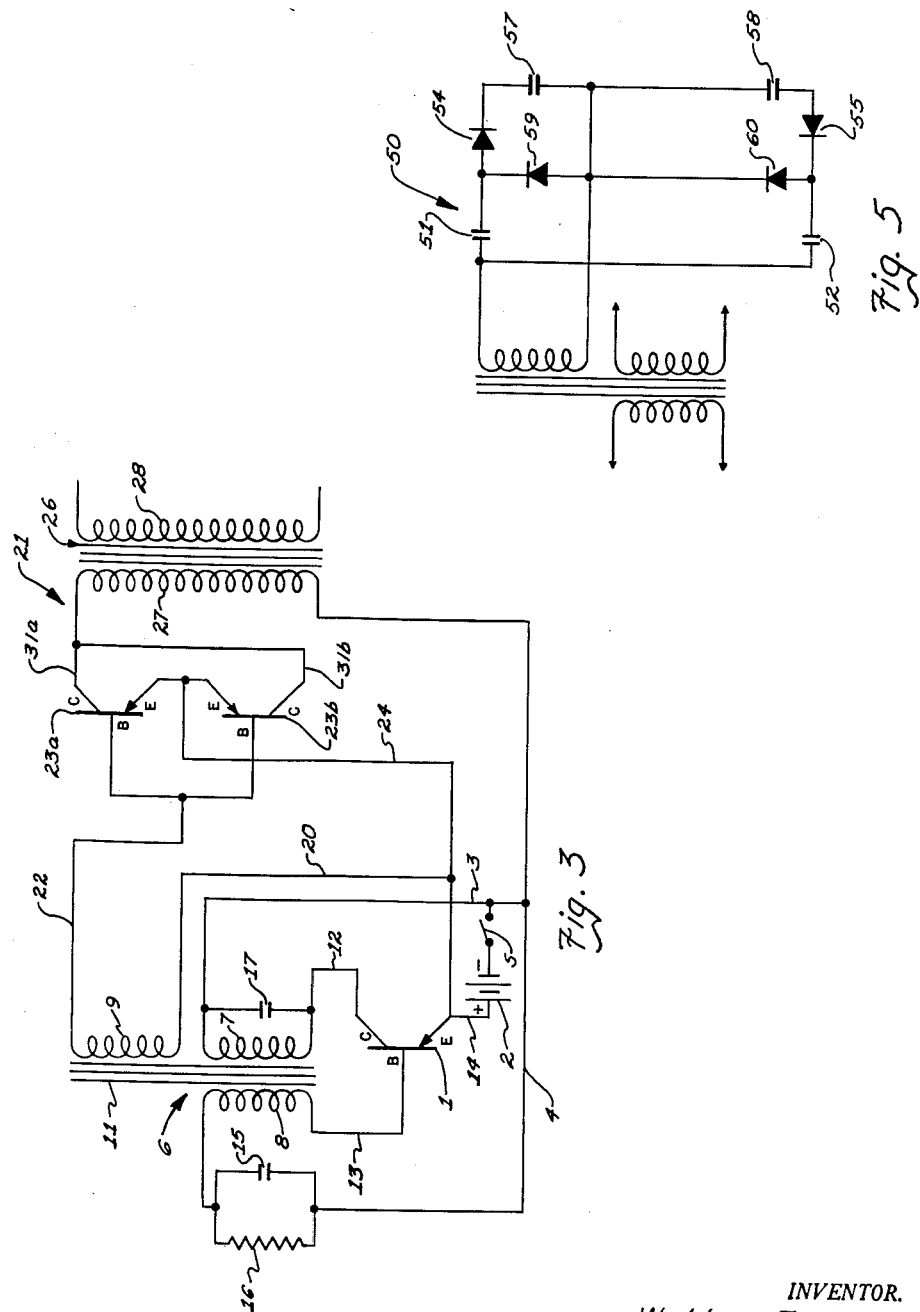

April 4, 1961
W. F. JOSEPH
2,978,627
TRANSISTORIZED POWER SUPPLIES
Filed Feb. 26, 1957
3 Sheets-Sheet 3
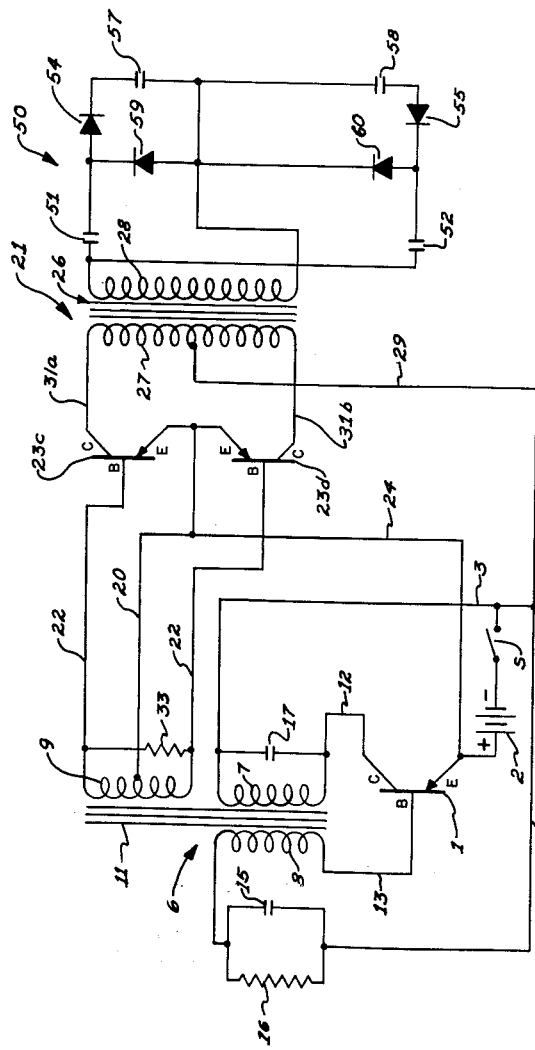
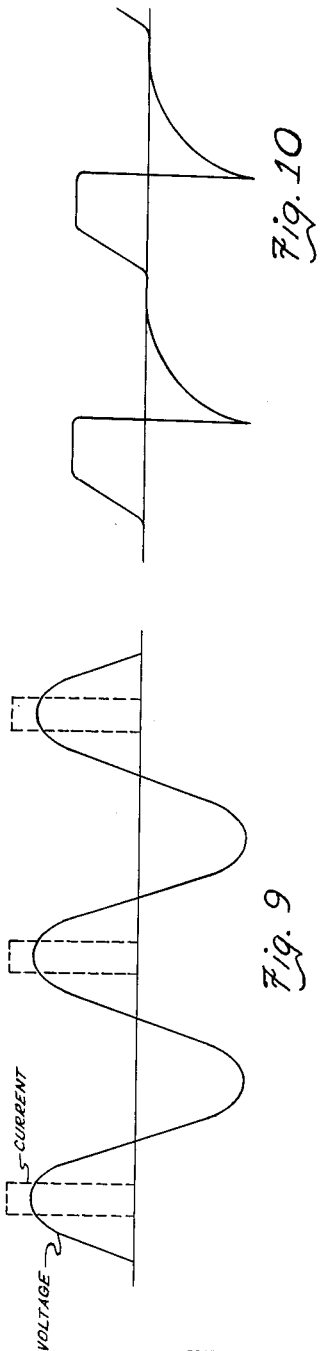
Fig. 4
Fig. 9
Fig. 10
INVENTOR.
Walter F. Joseph
BY United States Patent Office 2,978,627
Patented Apr. 4, 1961

2,978,627

TRANSISTORIZED POWER SUPPLIES

Walter F. Joseph, 1914 Arroyo Ave., San Carlos, Calif.

Filed Feb. 26, 1957, Ser. No. 642,625

10 Claims. (Cl. 321—8)

(Granted under Title 35, U.S. Code (1952), sec. 266)

The invention described herein may be manufactured and used by or for the Government of the United States of America for governmental purposes without the payment of any royalties thereon or therefor.

This invention relates to electrical means for converting low potential power, such as the power of a 1.5 volt flashlight cell, into the various potentials necessary to operate electronic and electrical equipment.

Conversion of power from such low potentials has been accomplished by such well-known means as vibrator and rotary type converters, although, for one reason or another, these converters have various limitations and disadvantages which seriously depreciate their use particularly when the size and weight of the equipment is a vital consideration. It also is recognized that the more familiar vacuum tube electronic circuits frequently are used for power application, although generally such tube means are presently unacceptable because they are incapable of being operated from low voltage potentials such, for example, as the 1.5 volt battery cell.

As to the various deficiencies of the converter methods, it is known that the vibrator type has serious limitations primarily because they produce comparatively low frequencies and thus require relatively large and heavy transformers. Also, in operation, they are noisy, subject to wear or to sticking of contacts. As far as commercially available models are concerned, these customarily require a large amount of driving power and are subject to interruptions of operation by the effects of mechanical shock. The rotary-type converters are not considered presently suitable because they are not available in sufficiently small sizes and, as has been found, when these converters are made sufficiently small, they become relatively inefficient. Conventional converters therefore are not wholly acceptable when such factors as low input potential, small size, high efficiency and stability are critical, and, for present purposes, such factors have been considered critical, although, as will become apparent, the principles of the present invention are beneficial even in fields where these factors do not form serious limitations.

As to the objects of the invention, the primary one is, as indicated, that of providing an efficient, dependable and stable means for converting a relatively low source of electrical energy into the various potentials necessary to operate electronic and electrical equipment.

In a general manner, this object is achieved by the use of semi-conductor means, such as a junction transistor, as the active element in a low potential or battery-powered oscillator circuit. In particular, the invention contemplates coupling such a transistor in a certain manner to a transformer, the coupling being so arranged that any increasing rate of change of battery current through the primary establishes a magnetic flux capable of opposing the battery current flow through the secondary. The secondary, in turn, is electrically connected in such a manner that increase or decrease of the primary current varies the potential of the base electrode of the transistor to the extent that the current variations are capable of "making" or "breaking" the conduction through the transistor.

A related object involves the amplification of the oscillator output and preferably this object is achieved by the use of power amplifiers which also employ transistors electrically connected to an output coil of the oscillator transformer.

A further object contemplates the provision of suitable oscillation modes for accomplishing various purposes to be described.

Other objects include the provision of a small, portable power supply in which the mechanical and electrical losses are reduced to a minimum to effect a high efficiency.

Additional objects will become apparent upon a more complete understanding of the principles of the invention.

The invention is illustrated by the accompanying drawings in which Fig. 1 is a circuit diagram showing the transistor oscillator and the manner in which its output may be amplified by a single transistor amplifier; Fig. 2, a transformer core wound in accordance with the principles of the invention; Fig. 3, a circuit diagram similar to Fig. 1 illustrating a modified amplification stage; Fig. 4, another circuit diagram similar to Fig. 3 showing a single-ended amplifier circuit using transistors connected in parallel; Fig. 5, a partial circuit showing a rectifier coupled to the output of the transistor oscillator of the invention; and Figs. 6–10, various wave forms established across particular connections when various oscillation modes are employed.

Before commencing the detailed description of the various forms of the invention, it is desired first to briefly consider the semi-conductor bodies or transistors which, as indicated, form the active element both in the oscillating and the amplification stages of the power supply. Such transistors now are quite well known and in fact have been described rather fully in a number of publications such as Gerald B. Herzog, U.S. Patent 2,663,800. For this reason, it will be assumed that the basic operation of these elements is understood at least to the extent of recognizing the manner in which the flow of the free electrons or so-called "holes" permit conduction, as well as the fact that variations in the relative potentials between the electrodes of the semi-conductor are capable of cutting-off or accelerating flow.

In a general manner, it is recognized that there are a number of different types of transistors such as the point-contact type, the junction type and others. Further, these different types may require different manners of coupling the semi-conductor to a source, such as a battery. For example, it is known that the junction type may either be what is known as a PNP type or an NPN and that, depending upon which type is used, the manner in which the element is coupled to the battery may be varied according to established rules. Similarly, the point contact transistor has the N type and the P type which may require different battery connections so as to bias the different electrodes in the correct potential direction. In the following description, it will be noted that a junction type transistor of the PNP variety is utilized and, for reasons concerned mainly with transistor characteristics, this junction type is preferred although the NPN type is fully operative. If another type were substituted, the principles of the invention would be equally applicable, although the battery connection would have to be altered according to known laws.

Referring then to the circuit diagram of Fig. 1, it is to be noted that a PNP transistor 1 is used as the active element in the oscillator portion of the circuit. Such a transistor conventionally is formed of a semi-conductor crystal such as germanium which may be diluted with an impurity of some sort that is added in a very minute quantity such as one part to a hundred million. Depending upon the impurity used, the germanium crystal may become either a P or an N type, the P or acceptor type crystal being diluted with an impurity such as indium which has a valence of 3 so as to produce a crystal which has an excess of protons or so-called "holes." In a like manner, the N type is formed by adding an impurity such as arsenic which has a valence of 5 capable of providing an excess of electrons. Transistor 1 then is formed by juxtapositioning P and N type crystals and, as seen, the N portion is formed as a thin layer sandwiched between two relatively thick P areas. Electrodes then are connected to the various areas and, according to common designations, the electrode connected to the thin central area is known as a base electrode B (Fig. 1) while the electrodes connected to the outer areas are known respectively as the collector and emitter electrodes C and E.

Such a PNP transistor has the characteristic that, when the B electrode is driven in the same potential direction as the C electrode, the transistor will conduct to a high degree, but, when B is driven in a potential direction opposite to the collector the conduction will substantially cut off.

One of the important features of the invention is the manner in which the transistor is coupled into the oscillator circuit and, in this regard, it will be noted (Fig. 1) that the circuitry includes a battery 2 which, as indicated, may be a low potential flashlight cell. The output of the battery is conducted by suitable leads 3 and 4 to a transformer 6, this transformer being formed of a primary coil 7 fed by lead 3, a secondary 8 coupled to the source by lead 4, and a third output coil 9; all of these coils, as shown in Fig. 2, being wound on a common core 11. Further, the primary is coupled to collector electrode C by line 12 while the secondary is coupled to base electrode B by a similar line 13, and, to complete both circuits, emitter electrode E, which is common to both the primary and secondary circuits, is connected to the "plus" side of the battery by a return line 14.

For purposes to be explained, other elements such as a condenser 15 connected in parallel with a resistor 16 and another condenser 17 are included. Also, a switch S is mounted in the secondary to make or break the supply of power both to the primary and the secondary.

Generally considering the operation of the circuiting thus far described, it will be noted that, when switch S is closed, battery current flows both to the primary and the secondary although, as is apparent, more current will flow to the primary than to the secondary. The initiation of current flow in the primary immediately establishes a magnetic flux which, through the phenomenon of induction, opposes battery current build-up in the coil. Nevertheless, the current continues to build up and, due to its increasing rate of change, a magnetic flux is established which affects the secondary through the principle of mutual induction common to all transformers.

In the present instance, however, it is important to note that the secondary of transformer 6 is wound on core 11 in a 180° phase-relationship with primary coil 7 with the result that the electromotive force induced in it acts to oppose the flow of current from the battery or source to and through the secondary. Therefore, while the current in the primary coil is building up, the battery current through secondary coil 8 is being opposed or restrained to the extent that the potential difference between the coils is increasing. Consequently, since secondary coil 8 is connected to base electrode B of the transistor and primary coil 7 to its collector electrode, the potential difference of these two electrodes is increasing and eventually a point can be reached at which the opposite potential directions of these two electrodes is sufficient to cut off the flow of current through the transistor.

Whether or not conduction through the transistor is entirely cut off, it will be understood that, when the current through the primary has reached its maximum to the extent that its rate of increase has ceased, the magnetic field surrounding the primary commences to collapse or decay. The collapse then acts to increase the flow of current from the secondary to the base electrode with the result that the potential difference between the base and the collector electrodes diminishes and eventually reaches a point at which conduction through the transistor again is permitted. When such conduction again is initiated, the current through the primary rebuilds and, as previously explained, eventually reaches a point at which the transistor conduction again is cut off. As will be recognized, at any time that conduction through the transistor is cut off, the battery circuit through the primary coil is opened so that resumption of transistor conduction is capable of initiating a current build-up in that coil. These circumstances continue to take place with the result that an alternating flow of current through the circuits results and consequently the oscillator function is present. The principle controlling the frequency of the oscillation as well as its mode are dependent upon other factors which will be discussed. However, it is of some importance at the present time to note that the oscillating function is present even though the semi-conductor may not be biased to a point of cut-off. In other words, the varying bias produced in the semi-conductor is sufficient to vary the conduction and, dependent upon circuit elements and values, to produce a sinusoidal wave form.

Since the oscillating function and oscillations of current are present in coils 7 and 8, coil 9, which is electrically coupled to the core, has an E.M.F. induced in it of oscillating nature. Coil 9, as has been indicated, is the output coil of the oscillator power supply and, for most applications, this power supply should be amplified by some suitable means.

Consequently, another important feature of the invention is the provision of appropriate amplifying means, such as amplifier 21 of Fig. 1 which, as may be seen, also employs transistor or semi-conductor means as its active element. More specifically, it is to be noted in Fig. 1 that transformer output coil 9 has one side connected by a line 20 to the positive side of battery 2, while its other side is coupled by a line 22 to another transistor 23 of amplifier 21. As seen, line 22 is coupled to base electrode B of this transistor, while its emitter electrode E is coupled back to the positive side of battery 2 by a line 24. Amplifier 21 includes the usual transformer 26 having primary and secondary coils 27 and 28, the primary being connected by line 29 through switch S to the negative side of battery 2. The other side of primary coil 27 is coupled by line 31 to collector electrode C of transistor 23. Operation of the transistor amplifier can be considered in conjunction with various oscillation modes that may be employed to achieve desired oscillator and amplifier efficiencies. These modes are identified as class A, class C, blocking mode 1, and blocking mode 2.

Class A oscillation produces approximately a sinusoidal wave form (not shown) achieved generally by biasing the transistor 1 into conduction during the full cycle of operation. The transistor is connected substantially as shown in Fig. 1 although resistor 16 and condenser 15 may be absent. In such an arrangement, even when the base to emitter voltage is zero, there will be a small amount of collector to emitter current conduction, so that, if the battery or source voltage is kept small enough to prevent collector current flow saturation, the oscillations will be sinusoidal at a frequency determined by the inductance in coil 7 and the capacitance in condenser 17. The condenser size may be of some convenient value, such as from zero to $\frac{1}{10}$ microfarad. Since transistors are used as active elements the turns ratio of the transformer is not too critical, and a ratio of 2 or 3 to 1 in most instances is satisfactory.

If the source voltage is increased, the collector circuit current eventually reaches a saturation value (re the maximum collector current flow for a given source voltage), and further increase in the base to emitter current fails to increase the collector current since the collector to emitter resistance value is at its lowest. Such conditions create the waveform shown in Fig. 6 and the flattening is due to saturation because the collector voltage cannot follow the input voltage beyond this point.

To obtain class C oscillation mode resistor 16 and capacitor 15 are included in the base emitter circuit with condenser 17 also retained. It then is possible to develop a base bias which tends to cut off the collector current. According to the electron flow theory, during conduction, the current flow is from the base to emitter so that current flows through the condenser and resistor, through coil 8 to the base. With condenser 15 and resistor 16 in the circuit, a much smaller current flows in the base-emitter circuit and collector current flow tends to be cut off since capacitor 15 is positively charged. To effect a suitable time constant as compared to the oscillation frequency, resistor 16 and condenser 15 may be proportioned to develop a bias which allows the collector current to flow in short pulses. Then, if the inductance in coil 7 and the capacitance in condenser 17 form a resonant circuit with a sufficiently high "Q" (a low loss), a sine wave, kept going by the periodical pulses of the collector circuit conduction, is produced. The class C mode waveform of voltage and current both are shown in Fig. 9 and it may be noted that, since the current pulses occur at the instance the collector winding voltage is maximum (the transistor resistance then being minimum), the circuit is of high efficiency.

Dispensing with condenser 15 and resistor 16 of Fig. 1, blocking oscillator mode 1 may be obtained if there is a sufficiently high source potential and the energy feedback is favorable. The potential should be should be sufficiently beyond that for class A and C so that the saturated portion of the waveform occupies an increased proportion of each cycle. The energy feedback ratio referred to is the energy fed from the collector back to the base. Due to self-inductance, even after the current has reached a maximum and the magnietic field has begun collapsing, the current flows will be held up so that ultimately during each conduction period enough energy can be stored (by the inherent inductance-resistance relationship time constant) to hold or prevent a return to cut-off for more than a single full cycle. Energy is therefore stored in the transformer and its winding which, together with the internal transistor resistance, acts as the inductance and resistance time constant.

Blocking mode 2, shown in Fig. 10, is obtained by increasing the values of resistor 16 and condenser 15 so that a large amount of charge or bias is effected and, due to the time constant of the resistance and capacitance of these components, a relatively long leakage time is produced. The oscillator then goes through an induction cycle, develops the mentioned blocking bias on condenser 15 and remains cut off until the bias has leaked sufficiently to allow another conduction cycle. The repetition rate is determined by the size of resistor 16 which may vary from 500 to 20,000 ohms and the capacitor size which is a function of the transistor bias desired.

Since there is a limited gain or amplification obtained by the use of an oscillator employing an amplifier which has only one transistor, other methods, such as a single-ended amplifier, may be used. A single-ended amplifier, having transistors connected in parallel is shown in Fig. 3 and, as seen, it is an oscillator substantially like that of Fig. 1. Output coil 9, however, has its lead 22 divided for connection with base electrodes B of a pair of transistors 23a and 23b. Also, collectors C of this pair are coupled by lines 31a and 31b to primary 27 of transformer 26, while electrodes E are coupled to the positive side of oscillator battery 2 by line 24 which divides in the manner shown. Output coil 9 also has its other end connected by a line 20 into lead 24 so as to couple this end to the emitters E. Such an arrangement permits an obvious increase in power over the arrangement shown in Fig. 1.

Despite the fact that the arrangement shown in Fig. 3 yields greater power, the transformer core to which such an amplifier is connected may have what has been termed a D.C. bias due to the magnetization. To prevent such condition a circuit similar to that of Fig. 4 may be used. The oscillator circuits of Figs. 1, 3 and 4 are substantially the same. However, the output from oscillator transformer coil 9 is fed into the base B electrode connections of another pair transistors 23c and 23d. As seen, a resistor 33 is connected across output leads 22 to govern the repetition rate of the circuit and to control the oscillation at the peak of feedback due to leakage reactance of coil 9. Emitter electrodes E of the pair of transistors are coupled back to battery 2 by the usual line 24, although as seen these electrodes are connected by line 20a to an intermediate take-off point on coil 9. Collector electrodes C are in this instance connected to opposite ends of amplifier transformer coil 27 while line 29, which couples coil 27 back to source, is tapped-off a central point on the coil. With such an arrangement a waveform of the type shown in Fig. 7 is produced from base B to base B connections of the pair transistors. Also, a typical collector to collector waveform is shown in Fig. 8. When driven sufficiently hard, the transistors act essentially like a switch resulting in a peak-to-peak voltage across primary coil 27 of approximately four times the battery voltage. The lower the internal transistor resistance from emitter to collector, the more the transistors act like a perfect switch and hence the closer the peak-to-peak voltage approaches four times the source voltage.

The core material of transformer 26 may be of any suitable stock such as supermalloy, or the like. Since its primary winding 27 is tapped at the center, the magnetomotive force in the upper portion of the winding sends the core flux in a counter-clockwise direction. Likewise, in the lower portion, the flux is in a clockwise direction permitting the net magnetization to be zero. The gain in such an arrangement is dependent upon the circuit elements including, of course, the turns ratio of the transformers. In addition, a quadrupling diode and capacitor network also shown in Fig. 4 further increases the D.C. voltage output. Of course, the best transistor for the output stage is one that may be driven to the lowest emitter to collector resistance with the smallest input power between the emitter and base so that the collector resistance should be a minimum and the current gain a maximum. Any good grade transistor will function satisfactorily and different characteristics of the transistors may be compensated merely by changing the value of resistor 33, which may be a potentiometer.

Assuming good core material, three determinations, namely, core size, turns ratio, and number of turns, must be considered in making an output transformer such as transformer 26 of Fig. 4. The smallest cores generally are large enough but upon the application of too much power the core will saturate before the current has reached full value and the output will be limited. Core size is dependent upon the amount of power to be handled and whatever number of turns are required to give sufficient multiplication to effect the required voltage. The primary winding voltage (the collector circuit voltage) will be twice the battery voltage (peak-to-peak) for a single-ended amplifier, and four times that amount for a push-pull amplifier. For instance, if the battery voltage is 2 volts and if a D.C. output potential of 160 volts is desired, the use of a push-pull amplifier results in a peak-to-peak primary voltage of 8. If then a turns ratio of 20 is used, a secondary peak-to-peak voltage of 160 volts is present. The use of a doubler circuit allows it to obtain the full peak-to-peak voltage as D.C. potential. The number of turns is determined by those on the primary needed to retain the magnetizing current at a sufficiently low value.

Connected to secondary winding 28 of transformer 26 is a quadrupling network or rectifying circuit generally designated by the numeral 50. The circuit includes a condenser 51 having one plate connected to winding 28 and another condenser 52 also connected to the winding. The two condensers have their other plates connected to diodes 54 and 55 which, in turn, are coupled to another pair of condensers 57 and 58. The remaining side of secondary winding 28 is connected between diodes 59 and 60 and between condensers 57 and 58. Winding 28 has an output waveform of some sinusoidal shape which may vary considerably. Since diodes permit but one portion of the wave to pass through them, one half of the wave may therefore pass through diode 54 and the other half through diodes 55, 59 and 60. Therefore the alternating current is converted to some form of direct current to double its magnitude. The diodes may be of any suitable types semi-conductor transistor diodes such as IN222. The condensers are employed for the usual purpose of smoothing the output and may be of any chosen size, such as 0.01 microfarad.

Such being the circuit arrangement and operation, the advantages over earlier converters should be more specifically considered. Thus, for example, since no mechanical members, such as vibrator reeds or other mechanical members are used, geotropic effects are eliminated and efficiency of the device increased. In contrast, vibrators which use mechanically-vibrating reeds exhibit serious geotropic effects. Also, since it is difficult to properly center the reeds, the result is that a non-uniform waveform is obtained. Hence, the load is fed with an unstable source which, of course, is not desirable. Also, the reeds have weight and hence some energy is expended both in driving them and in overcoming resistance to mechanical shock. The present use of the transistor oscillator and amplifier clearly avoids all these difficulties.

Another factor is that, because the transistor may operate efficiently on lower power potential, a smaller battery may be used and a smaller, lighter, more compact unit is permitted. Frequency is another consideration that should not be overlooked. For example, the use of mechanical members restricts the frequency of the oscillating wave to approximately 120 cycles and a large amount of metal in the transformer core is needed. However, with power supplies which require no mechanical members, the frequencies may be increased in range to 1 to 100 kilocycles and the core size may be decreased. Such also contributes to a small, light and compact supply.

By being enabled to use a small battery of one or two cells, as well as a transformer having a small core and other components of correspondingly smaller size, a greater degree of efficiency and retention of power may be obtained and therefore a more efficient and desirable circuit is employed. The utilization of the smaller components and a smaller battery supply reduces the electrical losses (transformer loss of lost magnetizing current and loss in dissipated heat). Battery life therefore is extended.

Transistors are inherently dependable and render trouble-free service. As a result, a power supply using such transistor elements both in the oscillator and amplification stages can be expected to render corresponding trouble-free services.

Briefly summarizing the present invention, the characteristic of the transistor which causes it to act substantially as a switch, along with the phenomenon of induction in the coils, effects an oscillating voltage. The efficiency of the oscillator circuit may approach 100% but generally it is about 40%. The secondary winding of the oscillator may have a voltage of about 5 volts to be fed into the amplifying portion. The type of amplifying system varies, depending upon the amount of amplification needed, the size of the D.C. power source, and also the type of output transformer employed. A single-ended amplifier may be employed having one active element, or two active elements may be employed connected in parallel. A push-pull amplifier (Fig. 4) may be used or, if desired, multiple stage amplifiers which are not shown. In the event that a single-ended amplifier having its active elements in parallel is used, the voltage (peak-to-peak) will be substantially doubled. If a push-pull type amplifier is employed the peak-to-peak voltage will be approximately 4 times the value of the battery. The turns ratio of the primary may be of suitable amount such as 50. The efficiency of the amplifier circuit may be 100% but, as a practical matter, it is about 60%. The quadrupling network or rectifying circuit then increases and converts the voltage to a higher value of approximately twice the value it has upon leaving the secondary of the output transformer. The ultimate voltage and amperage of a circuit such as that shown in Fig. 4 may be about 700 volts with about 80 microamps of current. The final voltage is substantially D.C. since the condensers perform the function of smoothing the current flow.

Obviously many modifications and variations of the present invention are possible in the light of the above teachings. It is therefore to be understood that within the scope of the appended claims the invention may be practiced otherwise than as specifically described.

I claim:

1. An oscillator comprising, a source of low potential; a transformer having primary, secondary and output coils inductively related by a common core, the ratio of the primary coil turns to the secondary turns is between 2 to 1 and 3 to 1; a semi-conducting body formed with collector, emitter, and base electrodes, said primary and secondary being inductively related in such a manner that current build-up in said primary produces a magnetic flux that opposes current flow from said source through said secondary for driving said base electrode toward a conductive cut-off potential whereby said electro-magnetic arrangement also acts upon cessation of said build-up and collapse of said flux to drive said base electrode to a conductive potential; means for electrically connecting said source and body to both said primary and said secondary coils whereby said means for connecting couples said semi-conducting body to said source through said electrode and said primary coil is connected to said collector electrode; and capacitor means for controlling the frequency of oscillations in conjunction with the inductance of the primary coil which comprises a condenser of between substantially zero and 1/10 microfarad that is connected in parallel with such primary coil.

2. An oscillator comprising a source of low potential, a transformer having primary, secondary and output coils inductively related by a common core, the ratio of the primary coil turns to the secondary turns is between 2 to 1 and 3 to 1; a semi-conducting body formed with collector, emitter, and base electrodes, said primary and secondary being inductively related in such a manner that current build-up in said primary produces a magnetic flux that opposes current flow from said source through said secondary for driving said base electrode toward a conductive cut-off potential whereby said electro-magnetic arrangement also acts upon cessation of said build-up and collapse of said flux to drive said base electrode to a conductive potential; means for electrically connecting said source and body to both said primary and said secondary coils whereby said means for connecting couples said semi-conducting body to said source through said electrodes and said primary coil is connected to said collector electrode; capacitor means for controlling the frequency of oscillations in conjunction with the inductance of the primary coil which comprises a condenser of between substantially zero and 1/10 microfarad that is connected in parallel with such primary coil; and impedance means for controlling the repetition rate of conduction of said semi-conducting body, said impedance means connected in series between said base electrode and said source.

3. An oscillator comprising a source of low D.C. potential, a transistor having at least emitter, collector, and base elements, a transformer having at least primary and secondary windings, said base electrode connected through said secondary winding and an impedance means in serial relationship to the negative side of said power supply, the positive side of said power supply being connected to said emitter element, said collector element being connected through said primary winding to said negative side of said power supply, and said primary and secondary winding being inductively related in a manner whereby a current increase in said primary winding produces a flux which opposes current from said source in said secondary winding.

4. The oscillator of claim 3 wherein said impedance means comprises a resistor and capacitor in parallel relationship.

5. The oscillator of claim 3 wherein said transformer has a non-saturating core.

6. The oscillator of claim 3 wherein the inductive coupling of said transformer is of insufficient amplitude to cut off base current.

7. The oscillator of claim 3 wherein the inductive coupling of said transformer is of sufficient amplitude to cut off base current.

8. The oscillator of claim 3 wherein said impedance means comprises a resistor.

9. A D.C. to A.C. converter comprising a source of low D.C. potential, a 1st transistor having at least emitter, collector, and base elements, a transformer having at least primary, secondary and output winding, said base electrode connected through said secondary winding and an impedance means in serial relationship to the negative side of said power supply, the positive side of said power supply being connected to said emitter element, said collector element being connected through said primary winding to said negative side of said power supply, and said primary and secondary windings being inductively related in a manner whereby a current increase in said primary winding produces a flux which opposes current from said source in said secondary winding, a 2nd transistor having at least emitter, collector and base elements, said 2nd transistor emitter and collector elements connected for excitation to said source, one end of said output winding connected to said 2nd transistor base element, another end of said output winding connected to said 2nd transistor emitter element whereby said 2nd transistor functions as an overdriven amplifier, and output impedance means connected to said collector element.

10. A D.C. to A.C. converter comprising a source of low D.C. potential, a transistor having at least emitter, collector, and base elements, a transformer having at least primary and secondary winding, said base electrode connected through said secondary winding and an impedance means in serial relationship to the negative side of said power supply, the positive side of said power supply being connected to said emitter element, said collector element being connected through said primary winding to said negative side of said power supply, and said primary and secondary windings being inductively related in a manner whereby a current increase in said primary winding produces a flux which opposes current from said source in said secondary winding and amplifying means coupled for D.C. excitation to said source, said amplifying means having a signal input coupled to said primary winding in a manner to overdrive said amplifying means.

References Cited in the file of this patent
UNITED STATES PATENTS

| | | |
|---|---|---|
| 2,662,122 | Ryder | Dec. 8, 1953 |
| 2,720,622 | Deuser | Oct. 11, 1955 |
| 2,745,012 | Felker | May 8, 1956 |
| 2,748,274 | Pearlman | May 29, 1956 |
| 2,753,509 | Merriam | July 3, 1956 |
| 2,776,372 | Ensink et al. | Jan. 1, 1957 |
| 2,780,767 | Janssen | Feb. 5, 1957 |
| 2,785,236 | Bright et al. | Mar. 12, 1957 |
| 2,791,739 | Light | May 7, 1957 |
| 2,804,547 | Mortimer | Aug. 27, 1957 |
| 2,854,614 | Light | Sept. 30, 1958 |